United States Patent
Darcy et al.

(10) Patent No.: US 9,411,560 B2
(45) Date of Patent: Aug. 9, 2016

(54) ERROR PROPAGATION

(75) Inventors: Joseph D. Darcy, Redwood City, CA (US); Stuart W. Marks, Mountain View, CA (US)

(73) Assignee: Oracle International Corporation, Redwood City, CA (US)

( * ) Notice: Subject to any disclaimer, the term of this patent is extended or adjusted under 35 U.S.C. 154(b) by 916 days.

(21) Appl. No.: 13/359,383

(22) Filed: Jan. 26, 2012

(65) Prior Publication Data

US 2013/0198727 A1  Aug. 1, 2013

(51) Int. Cl.
*G06F 9/45* (2006.01)
*G06F 9/44* (2006.01)
*G06F 11/36* (2006.01)

(52) U.S. Cl.
CPC ............. *G06F 8/37* (2013.01); *G06F 11/3624* (2013.01); *G06F 8/30* (2013.01); *G06F 8/40* (2013.01); *G06F 8/41* (2013.01); *G06F 8/443* (2013.01)

(58) Field of Classification Search
CPC ........ A61B 6/12; A61B 6/487; A61B 8/0841; A61B 8/12; G06F 9/542; G06F 8/41; G06F 8/30; G06F 8/443; G06F 8/40; H03M 13/29; H04L 67/1095; H04N 19/61; G06Q 10/02
See application file for complete search history.

(56) References Cited

U.S. PATENT DOCUMENTS

| | | | | |
|---|---|---|---|---|
| 6,634,023 B1 * | 10/2003 | Komatsu | .......... | G06F 8/445 717/159 |
| 7,197,747 B2 * | 3/2007 | Ishizaki | .......... | G06F 8/445 717/159 |
| 8,191,038 B1 * | 5/2012 | Samuel | .......... | G06F 8/41 717/136 |
| 8,250,544 B2 * | 8/2012 | McKinsey | .......... | G06F 8/443 717/131 |
| 2002/0059568 A1 * | 5/2002 | Kawahito | .......... | G06F 8/443 717/151 |
| 2003/0079211 A1 * | 4/2003 | Lueh | .......... | G06F 8/433 717/154 |
| 2004/0025084 A1 * | 2/2004 | Krueger | .......... | G06F 9/4812 714/35 |
| 2004/0261068 A1 * | 12/2004 | Ju | .......... | G06F 9/3834 717/159 |
| 2007/0074181 A1 * | 3/2007 | Zhanh | .......... | G06F 9/4443 717/136 |
| 2009/0193404 A1 * | 7/2009 | Kielstra | .......... | G06F 9/45516 717/148 |
| 2010/0088147 A1 * | 4/2010 | Guldner | .......... | G06Q 10/00 705/7.11 |

OTHER PUBLICATIONS

Prakash Prablu et al., Interprocedural Exception Analysis for C++, 2011, retrieved online on Mar. 17, 2016, pp. 1-26. Retrieved from the Internet: <URL: http://pages.cs.wisc.edu/~bgogul/Research/Papers/ecoop11.pdf>.*
Shujuan Jiang and Yuanpeng Jiang, An Analysis Approach for Testing Exception Handling Programs, ACM, Apr. 2007, retrieved online on Mar. 17, 2016, pp. 1-6. Retrieved from the Internet: <URL: http://delivery.acm.org/10.1145/1290000/1288259/p3-jiang.pdf?.*
"Exception Handling," downloaded on Jan. 25, 2012 from Wikipedia at http://en.wikipedia.org/wiki/Exception_handling, 11 pages, last modified Dec. 15, 2011.

* cited by examiner

*Primary Examiner* — Thuy Dao
*Assistant Examiner* — Hanh T Bui
(74) *Attorney, Agent, or Firm* — Robert C. Kowert; Meyertons, Hood, Kivlin, Kowert & Goetzel, P.C.

(57) ABSTRACT

A compiler may receive source code including two user source code blocks, each capable of throwing an exception. The received source code may be associated with a policy that discards a pending exception when a subsequent exception occurs. The compiler may transform the source code such that it allows for a propagation policy that supports multiple exceptions. The transformed source code may be executed in an execution environment. Upon execution of the transformed code, a pending exception may be propagated out and a later-in-time exception may be stored.

20 Claims, 4 Drawing Sheets

ERROR PROPAGATION

BACKGROUND

When a program violates the semantic constraints of a programming language (e.g., Object-oriented computer programming languages, such as Java™, C++, C#, among others), an error may be signaled (e.g., by a virtual machine or other execution environment) to the program as an exception, which may be defined as an event that occurs during the execution of a program that disrupts the normal flow of instructions. One example of such a violation is an attempt to index outside the bounds of an array. Some programming languages and their implementations react to such errors by peremptorily terminating the program while other programming languages allow an implementation to react in an arbitrary or unpredictable way.

Still, other programming languages (e.g., Java™) specify that an exception will be thrown when one or more semantic constraints are violated and will cause a non-local transfer of control from the point where the exception occurred to a point that can be specified by the programmer. An exception is said to be thrown from the point where it occurred and is said to be caught at the point to which control is transferred. During the process of throwing an exception, the Java™ virtual machine may abruptly complete, one by one, any expressions, statements, method and constructor invocations, initializers, and field initialization expressions that have begun, but have not completed execution in the current thread. This is often referred to as "unwinding the stack." This process may continue until a handler is found that indicates that it handles that particular exception by naming the class of the exception or a superclass of the class of the exception. If no such handler is found, then the exception may be handled by one of a hierarchy of uncaught exception handlers.

In some instances, a second exception occurs while the first exception is still in the midst of being handled as opposed to exceptions merely being sequential (e.g., the first exception is raised and handled, then the second exception is raised and handled). As an example using try-catch-finally and try-finally statements, if one exception occurs within one code block (e.g., a try block) and then a subsequent exception occurs in another code block (e.g., a finally block), the first occurring exception is discarded (e.g., neither stored, nor propagated) and the subsequent exception is propagated. Further elaborating on the example, if a finally block is executed because of abrupt completion of a try block and the finally block itself completes abruptly, then the reason for the abrupt completion of the try block may be discarded and the new reason for the abrupt completion may be propagated. In such instances, information regarding the first error is lost, obscuring the root cause, making the problem harder to diagnose and debug, resulting in systems that are less reliable and robust.

SUMMARY

A system and method is disclosed for transforming source code to modify an error propagation policy such that it supports multiple exceptions. A compiler may be configured to receive source code that includes a first user source code block capable of throwing a first exception and a second user source code block capable of throwing a second exception. The received source code may be associated with a policy that discards a pending exception when a subsequent exception occurs. The compiler may be configured to transform the received source code such that, when executed, the transformed source code allows the first exception to be propagated and the second exception to be stored. In one embodiment, the first exception may occur in time before the second exception.

In various embodiments, transformed code may be received. The received transformed code may be the result of the transformation of source code that includes first and second user source code blocks each capable of throwing exceptions. The source code may be configured to apply a policy that discards a pending exception when a subsequent exception is thrown. In one embodiment, the transformed code may be configured to implement a different policy that propagates a first exception and stores a second exception. The transformed code may be executed, which may include: generating a first exception, generating a second exception, and propagating the first exception and storing the second exception. In some embodiments, the first exception may occur in time before the second exception.

Figure 1:
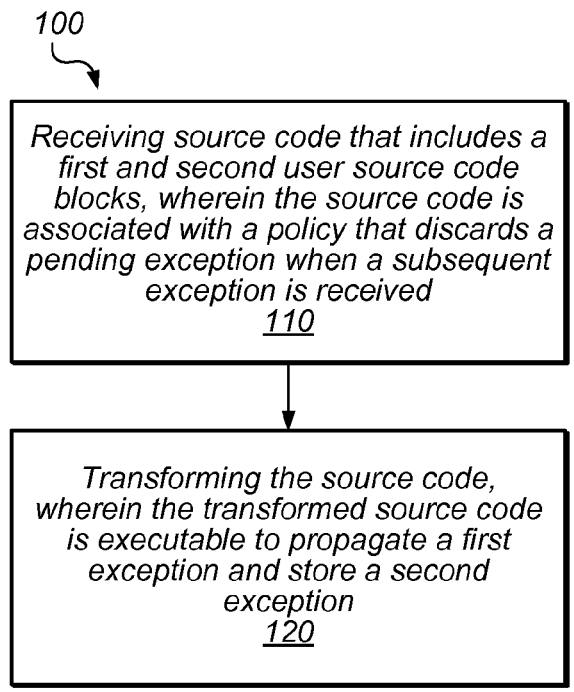
FIG. 1 is a flow diagram illustrating a method for transforming source code to implement an error propagation mechanism that supports multiple exceptions, according to various embodiments.

While the disclosure is described herein by way of example for several embodiments and illustrative drawings, those skilled in the art will recognize that the disclosure is not limited to the embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope of the present disclosure as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units ...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"First," "Second," etc. As used herein, these terms are used as labels for nouns that they precede, and do not imply any type of ordering (e.g., spatial, temporal, logical, etc.). For example, in source code having multiple user code blocks capable of throwing exceptions, the terms "first" and "second" exceptions can be used to refer to any two exceptions, thrown by any code block. In other words, the "first" and "second" exceptions are not limited to logical exceptions 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Various methods, systems, and medium are described for transforming source code to implement an error propagation policy that supports multiple exceptions. Additionally, various methods, systems, and medium are described for executing transformed source code that implements an error propagation policy that supports multiple exceptions. Many of the following code examples are illustrated using Java™ syntax and described in terms of Java™ examples. However, one of ordinary skill in the art having benefit of this disclosure will understand that the techniques described herein are applicable to many different current (e.g., C#, C++, etc.) and future programming languages.

A variety of rules or policies for handling exceptions may exist. As described above, one such policy may be to discard the first occurring exception and propagate the second occurring exception. Other policies may include: propagating the first occurring exception and discarding the second, propagating the first occurring exception and storing/recording/deferring the second, storing/record/deferring the first and propagating the second, and synthesizing a third exception that is a composite of the first and second occurring exceptions. Policies that include storing, recording, or deferring one of the exceptions may be implemented in a number of ways. In one embodiment, an exception may be stored in a suppressed exception list. A suppressed exception list may be usable to store a number of exceptions that are not immediately propagated out. In another embodiment, the exception that is not propagated out may be handled later by an uncaughtExceptionHandler or similar global handler, or it may be handled currently by a global handler (e.g., on error do handle_errors). Yet, in other embodiments, the other exception may be handled after the first has been handled. While much of the disclosure is described in terms of an exception handling policy that discards the first occurring exception and propagates the second exception, it is understood that the disclosed techniques may apply equally in systems that implement other exception handling policies. Additionally, in some embodiments, one policy (e.g., discard first, propagate second) may be modified into another policy by direct implementation in an interpreter, direct implementation in a compiler, transformation of source code, transformation of internal representation (e.g., parse tree), or transformation of output format (e.g., byte code).

Turning now to FIG. 1, one embodiment of a method for transforming source code to implement an error handling mechanism that supports multiple exceptions is illustrated. While the blocks are shown in a particular order for ease of understanding, other orders may be used. In some embodiments, method 100 of FIG. 1 may include additional (or fewer) blocks than shown. Blocks 110-120 may be performed automatically, may receive user input, or may use a combination thereof. In some embodiments, one or more of blocks 110-120 may be performed by a compiler, such as compiler 400 of FIG. 4.

As shown at 110, source code may be received. In various embodiments, the received source code may include multiple source code blocks (e.g., first and second source code blocks) that are each capable of throwing exceptions. The multiple source code blocks may be referred to as sibling code blocks. The source code may include a first user source code block capable of throwing a first exception and a second user source code block capable of throwing a second exception. In one embodiment, the first exception may occur in time before the second exception while in other embodiments, the first exception may not occur before the second exception. "User source code blocks" are used herein to describe original user generated code blocks that are not further modified by machine (e.g., compiler generated) or automated processing. Note that user source code blocks may include automatically generated original source code blocks in that are not further processed. On the other hand, user source code blocks may not include the code that results from further processing, such as processed code that is produced from a desugaring or compiling process. In some embodiments, the source code may be provided in one or more files and may be specified in one or more high-level and/or object-oriented programming languages, such as Java™, C++, C#, etc. For example, a user generated code block may include a Java™ try block, a Java™ catch block, or a Java™ finally block. Other comparable constructs in other languages (e.g., C#, C++, etc.) may exist. A Java™ finally block may be a clean up block that may perform various operations and complete execution of the finally block before propagating a pending exception. A pending exception is defined as an exception that has been thrown, but whose handling has not yet been completed. Moreover, additional code can run while an exception is pending. For example, code in finally blocks of a try statement, from which a pending exception was thrown, may run while that exception is pending. As described herein, the source code may be associated with a policy that discards pending exceptions if a subsequent exception is thrown (e.g., by a finally block throwing its own exception). In such instances, discarding a pending exception is used herein to mean that that particular exception may not be not propagated or stored (e.g., for later retrieval), and that no record may be made of the exception. In some cases, the received source code may include one or more checked exceptions.

Two examples, A and B, of received source code (presented in pseudo-code format) may be as follows:

A: try { T; } finally { F; }
B: try { T; } catch ($E_1$ $e_1$) { $C_1$; } ... catch ($E_n$ $e_n$) { $C_n$; } finally {F; } where T, F, and C, may be general sets of statements and $E_i$ may be exceptions caught by the original catch blocks. In example A, the first and second user source code blocks may be a try block followed by a finally block, respectively. Each may be capable of throwing an exception. The T and F may be any number of statements. In example B, in addition to the try and finally blocks, one or more catch blocks are included, each of which may also generate an exception. In the case of example B, the first user source code block may be the try or catch block and the second user code block may be the finally block.

In various embodiments, the received source code may be associated with a policy that discards a pending exception when a subsequent exception occurs. As a result, such a policy may not be able to support multiple exceptions. Consider the following scenario in which example A is the received source code that includes a try block and a finally block. If upon execution, one of the statements in the try block does not complete normally (e.g., terminates abruptly), an exception may be thrown. The try block may be aborted and the execution may immediately proceed to the finally block. If the finally block completes normally, the exception from the try block that was held pending may be propagated out to a calling method after the finally block finishes. For example, the exception may be caught by another calling block higher up the stack. In some instances, however, the finally block may also terminate abruptly and throw an exception. Because the received source code in this example applies a policy that discards a pending exception when a subsequent exception occurs, upon execution, the exception from the finally block may be propagated out and the exception from the try block may be discarded (e.g., not propagated, not stored, no record made of the exception, etc.).

Similarly, consider the following scenario in which example B is the received source code that includes a try block, one or more catch blocks, and a finally block. The try block may terminate abruptly and none of the catch blocks may be configured to catch the particular exception from the try block. In such a scenario, the exception from the try block may still be pending when the finally block is executed. In certain circumstances, the finally block may also throw an exception. As was the case with example A, the exception from the finally block may be propagated out and the exception from the try block may be discarded. Similarly, in other scenarios in which example B is the received source code including a try block, one or more catch blocks, and a finally block, the try block may throw an exception that matches one of the catch blocks. The matching catch block may then execute. If the catch block completes normally, the exception from the try block is considered handled. Then, the finally block can be executed and either complete normally or throw its own exception. If the catch block itself throws an exception, the exception from the catch block may be held in a pending state during execution of the finally block. Once again, if the finally block itself throws an exception, the pending exception from the catch block may be discarded and the exception from the finally block may be propagated under the policy that discards a pending exception when a subsequent exception occurs. Note that the received source code may include other similar compositions (e.g., other combinations of try, catch, finally, and/or other blocks of user source code) that are associated with such a policy.

As illustrated at 120, the source code may be transformed. The transformed source code may, in some embodiments, be executable to propagate a first exception and store a second exception. In one embodiment, the transformed source code may be of the same type of sources as the source code. For example, the transformed source code may be a modified version of the source code, which may be intermediate code that may be further compiled or processed before execution. As a result, executing the transformed source code, may, in some embodiments, not actually be performed on the transformed code but may actually be performed on a further compiled version of the transformed code. In the Java™ example, by desugaring (transforming) the received source code (e.g., try-catch or try-catch-finally statements, etc.) into different valid Java sources, alternate exception propagation policy may be implemented. In other instances, the transformed source code may be translated, or desugared, directly into byte-code level constructs. For such instances, again using Java™ as an example, the byte-code level constructs may not be directly mappable to Java™ sources. The transformed source code, when executed, may implement a different policy than the policy associated with the original received source code. The different policy may allow the first exception to be propagated and the second exception to be stored, with the first exception occurring earlier in time in some instances. In other instances, the first exception may not occur earlier in time than the second exception. The stored exception may be retrievable from a suppressed exception list that is usable to store a number of exceptions that are not immediately propagated out. Thus, neither exception of the first and second exceptions may be lost.

In some embodiments, the compiler may generate transformed source code that may violate rules (e.g., Java™ rules). For example, the compiler-generated transformed code may violate Java™ rules regarding checked exceptions as long as the resulting class file is valid. Thus, the compiler transformed code may be code that a programmer/user may not write.

The transformation from the received source code to the transformed source code may depend on a number of factors, parameters, and/or characteristics. For example, the compiler may be configured to receive a parameter and transform the source code based on the parameter. Parameters may include the length of the source code, execution speed of the compiler, system requirements, user specified parameters, complexity of the source code, run time environment, compile time behavior, presence of checked exceptions, presence of closures, and/or composition of the source code (e.g., which and how many user blocks). Other possibilities for parameterization may include an explicit declaration in the source code, whether supported by a language feature, in a commenting convention, or as a pragma, annotation, or metadata of some sort. As a result, the transformation may be performed in one manner for received source code and in another manner for different received code, for example, based on one or more parameters. Source code includes a variety of properties, which may or may not be preserved under transformation. Some properties may be important to be preserved while others may be less so. If a property is less important to preserve, a transformation that does not preserve the property may be smaller, simpler, and/or faster than a transformation that preserves the property. Accordingly, the method of transformation may also vary the level of preservation between the original source code and the transformed source code. An example of a property that may or may not be preserved is the can-throw semantics of code. Each block of code may have a set of checked exceptions that it can throw. A transformation may preserve the can-throw semantics of some code, or a simpler transformation could be made that may not preserve those particular semantics. Thus, in some instances, properties of the transformed source code may match the semantics (e.g., can-throw semantics) of the received source code while in other instances, it may not. Note that the degree/amount of preservation of the various properties between the source code and the transformed code may be referred to as the fidelity or computed fidelity. Further note that a lower fidelity transformation does not necessarily mean that it is worse than a higher fidelity transformation (e.g., in terms of transformed code or transformation quality). Instead, lower fidelity means that fewer properties are retained through transformation and higher fidelity means that more properties are retained through transformation.

In various embodiments, the source code may be compiled into an executable version. The executable code may be executed in a runtime environment. In one embodiment, upon execution, a first exception may be thrown and may be pending when a second exception is thrown. The first exception may be propagated and the second (later in time) exception may be stored, for instance, to a suppression list. The stored second exception may be retrieved from the suppression list in some embodiments. In a cascading error situation, this may allow the first occurring failure in a series of failures to be propagated out with the others being retrievable from the suppression list. In various instances, the first exception may not occur before the second exception. Moreover, other additional exceptions may also be stored in the suppression list.

Examples of transformed source code that may support the described exception propagation semantics are shown in the pseudo code below. As described herein, the desugaring in the following examples may differ in the degree of preservation of various properties of the transformed code to the original semantics of the user source code. In each of the cases, at run-time, the proper exception may be thrown according to the modified propagation semantics. As described, the examples below each may operate to propagate a first-in-time exception and store a later-in-time exception to a suppression list. In other implementations, the first-in-time exception may be stored and the later-in-time exception may be propagated out.

```
// First Example-Transformation of Example B above
{
    Throwable #primaryException = null;
    try {
        T;
    } catch(Throwable t0) {
        #primaryException = t0;
        try {
            throw t0;
        } catch(E_i e_i) {
            #primaryException = null;
            try {
                C_i;
            } catch(Throwable t1) {
                #primaryException = t1;
                throw t1;
            }
```

-continued

```
        } // Same can-throw state here as before original finally.
          The original finally may
    come from the finally block of Example B.
    } finally {
        Throwable #secondaryException = null;
        try {
            F;
        } catch(Throwable t2) {
            #secondaryException = t2;
        }
        finally {
            if (#primaryException == null) {
                if (#secondaryException != null)
                    throw #secondaryException; // imprecise info
                // else normal termination of try-catch-finally
            } else {
                if (#secondaryException != null)
                    #primaryException.addSuppressed(#secondaryException);
                throw #primaryException;
            }
        }
    }
}
```

The first example may represent transformed source code where the received source code was example B from above. The first example may, in some instances, not have the full benefit of precise rethrow analysis, as described below. Additionally, in the illustrated first example, no new types are included. Describing the first example in more detail, the variable primaryException may be initialized to null near the beginning of the transformed code because an exception may not be thrown prior to that point in the code. The desugared code may hold the exception explicitly. As such, the first catch block may catch any exception that comes out. That exception may then be the pending exception. It may be indicated by storing t0 into the primaryException variable. t0 may then be thrown even though it was just caught. As shown, the actual catch parameters may be in the inner try block. Inside the catch block, the primary exception may be cleared such that a pending exception does not exist anymore. The catch block may be replicated as many times as it was present in the original source code. Thus, if the original source code contained three catch blocks, the transformed code may likewise contain three catch blocks. As shown in the first example of transformed code, a try-catch block may exist around the original catch block ($C_i$). If the catch block throws an exception, a pending exception situation may again exist. Then, the exception may be rethrown after it is caught. Through the desugaring, it may be known if a primary exception occurs in the try or catch block. Moreover, in the first example, one primary exception may come from the try or catch block and a secondary exception may come from the finally block.

The same can-throw state comment in the middle of the first example indicates that if some statement occurs in a try block, the set of exception types that can be thrown may be preserved. In some embodiments, the transformed code up to the finally boundary may be based on the translation of the original try-catch block. Up to that boundary, the desugaring may have full fidelity of acceptance information and may be the same as the original try-catch block. After that boundary, however, the desugaring may not have full fidelity because that portion of the code may throw a general variable that is not final; the compiler may think that the variable is any possible value. As shown, in the finally portion of the transformed code, another variable, secondary exception is declared with a catch global around finally. As a result, one or both exceptions of the try-catch-finally may be recorded. If there is only one exception, that exception may be thrown or rethrown. If two exceptions occur, then the secondary exception may be added to a suppression list and the primary exception may be thrown. In some embodiments, because the compiler may generate the transformed code after checks for the presence of exception handlers are made on the original source code, the compiler may not generated a compile-time error even in the presence of checked exceptions.

A second example of transformed source code that may support the described exception propagation semantics is provided below. As with the first example, the second example of transformed source code may be a transformation of Example B above. The second example may have the benefit of a precise rethrow analysis and may also include a nonce exception type. Note that in the illustrated example, the second example may have full fidelity with the original received source code.

```
// Second Example-Transformation of Example B above
try {
  try {
    T;
  } catch(E_i e_i) {
    C_i;
  }
} // Same can-throw state here as before original finally. The original finally may come
from the finally block of Example B.
  throw new PrivateNonceException( ); // Force execution of catch block
} catch(Throwable #primaryException) {
  try {
    F;
  } catch(Throwable #secondaryException) {
    if (#primaryException != null &&
        #primaryException.getClass( ) != PrivateNonceException.class) {
      #primaryException.addSuppressed(#secondaryException);
      try {
        throw #primaryException;
      } catch(PrivateNonceException pne) {
        // Remove nonce from can-throw set
        throw new AssertionError("Not reached");
      }
    } else
      throw #secondaryException;
  }
  if (#primaryException != null &&
      #primaryException.getClass( ) != PrivateNonceException.class) {
    try {
      throw #primaryException;
    } catch(PrivateNonceException pne) {
      // Remove nonce from can-throw set
      throw new AssertionError("Not reached");
    }
  } // else normal termination
}
```

As indicated above, the second example may have the benefit of a precise rethrow analysis and may also include a compiler internal exception type (nonce exception type), PrivateNonceException. PrivateNonceException may be checked or unchecked; if unchecked, checked exception filtering, shown above, may not be required. PrivateNonceException may be an internal signaling mechanism that may force a catch block to be thrown by forcing code in a catch block to be executed; otherwise, the exception may be ignored. Specifically, in one embodiment, if the PrivateNonceException exception occurs, it may be known that the try or catch block did not terminate abruptly but that the compiler's own generated code did. As a result, the exception based on the compiler's own generate code may be ignored. If, however, the primary exception was a true exception without an additional one, the primary exception may be thrown again.

Forcing the catch block execution may enable a more precise rethrow analysis. A more precise rethrow analysis may determine if the exception that is caught is an exception that should have been thrown from that particular block (e.g., a try block). If the exception that is caught is something that the try block could have thrown, the exception may be rethrown. As an example, if the compiler knows that a try block may throw only two checked exceptions, it may also be known that the catch block should only rethrow those two exceptions if they are received/caught from the try block. Thus, the compiler may be intelligent enough to know what is expected to come in and then determine what actually came in. Based on the determination, the caught exception may or may not be rethrown.

Third and fourth examples of transformed source code that may support the described exception propagation semantics are provided below. Each of the third and fourth examples uses an AutoCloseable mechanism to achieve their goals. An AutoCloseable is an object (often representing an external resource) that can be used in a variation of the try-statement called the try-with-resources statement. An example try-with-resources statement may be represented as: try $(AC_1; \ldots; AC_n)$ {T;} catch $(E_1\ e_1)$ $\{C_1;\}$ ... catch $(E_n\ e_n)$ $\{C_n;\}$ finally $\{F;\}$. The example try-with-resources statement is similar to Example B above with the addition of one or more AutoCloseable declaration in parentheses following the 'try' keyword. The close( ) method of the AutoCloseable may be guaranteed to be called immediately after T is executed, regardless if T completes normally or abruptly. If an exception arises from the execution of the AutoCloseable's close( ) method, it may be added to the suppressed exception list of an exception thrown from T; otherwise, it may be propagated normally.

The third example may use extended anonymous inner classes as closures. The A case corresponds to the A example source code above (having a try-finally block) and the B case corresponds to the B example source code above (having a try-catch-finally block with one or more catch statements).

```
// Third Example
// Desugaring for A:
try (AutoCloseable #ac = new AutoCloseable( ) {
    public void close( ) throws Exception {
        F;
    }
}) { T; }
// Desugaring for B:
try (AutoCloseable #ac = new AutoCloseable( ) {
    public void close( ) throws Exception {
        F;
    }
}) {
    try { T; } catch (E₁ e₁) { C₁; } ... catch (Eₙ eₙ) { Cₙ; }
}
```

In the third example, the finally block, F, may be moved into an anonymous inner class. Note that the close method may throw an exception (e.g., I/O exception, etc.). As shown, the close method into which the F block is moved may be of a synthesized autocloseable type. Moving the F block may cause it to fail with existing Java source semantics if non-final (or non-effectively-final) local variables are captured. For the B case, an inner try statement may be generated that includes the original try code and the original catch block.

The fourth example of transformed source code that may support the described exception propagation semantics may use extended anonymous classes and synthesize a nonce closeable type, which may allow for more precise exception information.

```
// Fourth example
/*
 * Create a nonce AutoCloseable subclass whose
 * close( ) method is declared "throws FCT" where FCT is the exception
 * type that can be thrown by the code in the finally block (in the
 * sense of "can throw" as used by the JLS). An instance of this nonce
 * subclass may be used as the resource variable instead of a
 * subclass of AutoCloseable.
 */
// Desugaring for A:
{
    class #NonceAutoCloseable implements AutoCloseable {
        public void close( ) throws FCT {
            F;
        }
    }
    try (#NonceAutoCloseable #ac = new #NonceAutoCloseable( );) { T; }
}
// Desugaring for B:
{
    class #NonceAutoCloseable implements AutoCloseable {
        public void close( ) throws FCT {
            F;
        }
    }
    try (#NonceAutoCloseable nac = new #NonceAutoCloseable( )) {
        try { T; } catch (E₁ e₁) { C₁; } ... catch (Eₙ eₙ) {Cₙ; }
    }
}
```

Structurally, the fourth example is similar to the third example above. One notable difference is that the fourth example includes an explicit declaration of a synthesized type instead of an anonymous type. Also in the fourth example, a named subclass of autocloseable may be synthesized that has a specific declared close clause for its close method. The close clause may match the original can-throw information from the finally block. This example may use more elaborate desugaring, which may better capture the semantics of the original source code.

By transforming source code according to the techniques described herein, suppressed exception support and a propagation policy that supports multiple exceptions may be achieved. Such enhanced propagation support may be achieved without requiring a user to use new statements or block types. Moreover, the first error to occur may be preserved and/or propagated out in cascading error situations, which may allow for an earlier error or source of an error to be determined rather than only knowing the last error to occur.

Figure 2:
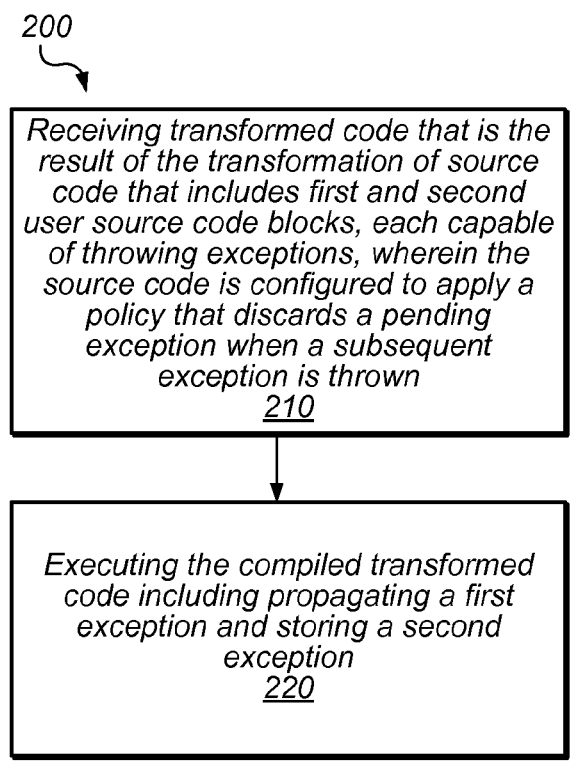
FIG. 2 is a flow diagram illustrating a method for executing transformed code to implement an error propagation mechanism that supports multiple exceptions, according to various embodiments.

Turning now to FIG. 2, one embodiment of a method for executing transformed code to implement an error handling mechanism that supports multiple exceptions is illustrated. While the blocks are shown in a particular order for ease of understanding, other orders may be used. In some embodiments, method 200 of FIG. 2 may include additional (or fewer) blocks than shown. Blocks 210-220 may be performed automatically, may receive user input, or may use a combination thereof. In some embodiments, one or more of blocks 210-220 may be performed, for example, by a computing device executing a virtual machine. In some instances, the method of FIG. 2 may be used in conjunction with the method of FIG. 1.

At 210, transformed code may be received. Transformed code may be the result of transforming source code that includes multiple user source code blocks, with each of the multiple user source code blocks being capable of throwing exceptions. The source code may be configured to apply a policy that discards a pending exception when a subsequent exception is thrown. In various embodiments, the transformed code may be configured to implement a different policy that propagates a first exception and stores a second exception. The transformed code may include byte-code level constructs or may be other valid code sources.

As shown at 220, the transformed code may be executed. In one embodiment, executing the transformed code includes propagating a first exception and storing a second exception (e.g., to a suppression list). In one embodiment, the first exception occurs earlier in time than the second exception. Execution of the transformed code may be at run-time. In various embodiments, execution may be performed in an execution environment, which executes the code, thereby creating various output data and/or behavior including a propagation policy that may permit suppressed exception support and allow for multiple exceptions without losing exception data. In various embodiments, the execution environment may include a physical computer system, a virtual machine (e.g., Java™ Virtual Machine), a software environment (e.g., container, web browser, etc.), support libraries, and/or various other components usable to execute the transformed code, either directly or by interpretation.

In some embodiments, the transformed code may not be directly executed. In such embodiments, prior to executing the transformed code, the transformed code may be further compiled into an executable version. For instance, transforming the source code may result in a modified version of the source code. As an example using Java, the original source code may include try-catch and/or try-catch-finally statements. Transforming may include desugaring those statements into different valid Java sources that are capable of implementing alternate exception propagation policies. Prior to executing the code in a virtual machine, the different valid Java sources may be compiled into byte-code level constructs. In other embodiments, the initial transformation may desugar the original source code directly into byte-code level constructs that may not be directly mappable to Java sources.

Figure 3:
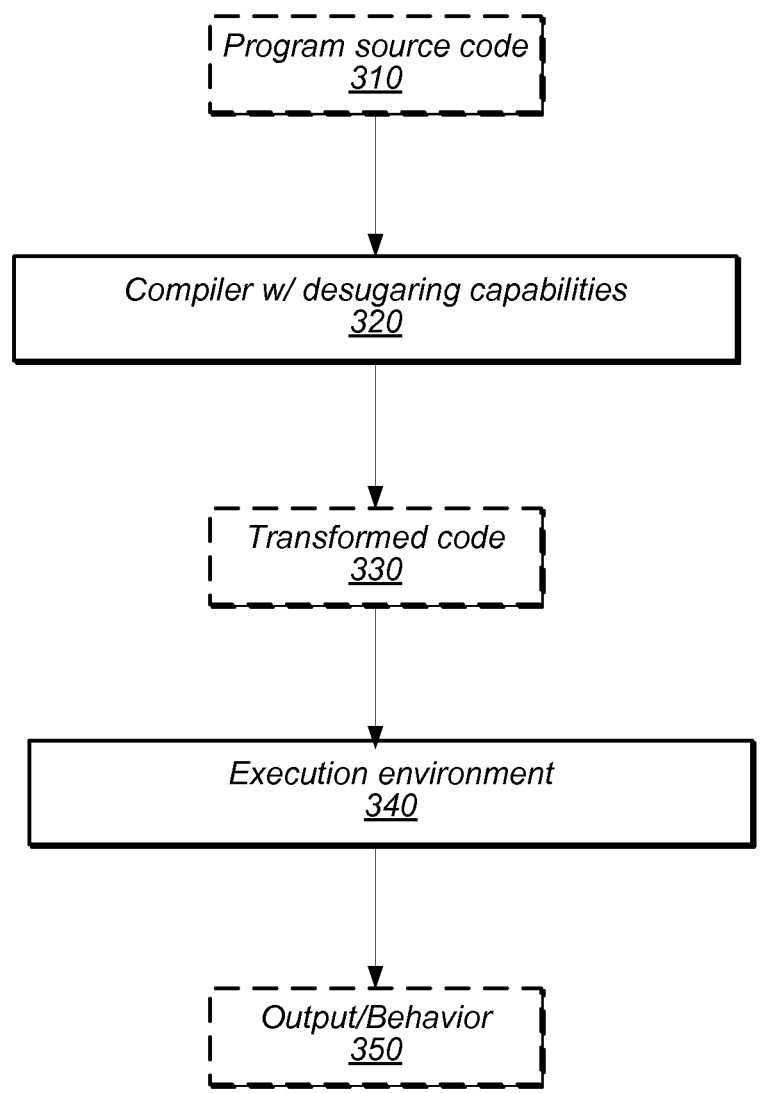
FIG. 3 illustrates a workflow for compiling and executing a computer program specified in a high-level language that supports multiple exceptions, according to various embodiments.

FIG. 3 illustrates a workflow for compiling and executing a computer program specified in a high-level language, according to various embodiments. In FIG. 3, solid outlines indicate operational components 320 and 340 while dashed outlines (e.g., 310, 330, and 350) indicate data passed between these components.

According to the illustrated embodiment, the workflow begins when a compiler with desugaring capabilities, such as 320, receives source code for a computer program, such as 310. In various embodiments, source code 310 may be specified in various high-level and/or object-oriented programming languages, such as Java™ and/or other languages. In some embodiments, source code 310 may be specified using a combination of languages, which may include one or more low-level and/or intermediate languages (e.g., assembly). The embodiments disclosed herein are described in terms of Java™ programs, though as noted above, various other languages may be used.

According to the illustrated embodiment, compiler 320 may transform source code 310 into transformed code, such as 330. In various embodiments, transformed code 330 may be encoded as valid Java sources, in a byte-code, binary machine language, and/or in other various executable formats. In some instances, parts of transformed code 330 may be in byte-code while others are in a native binary machine language. In some embodiments, and not shown in FIG. 3, compiler may produce intermediate transformed code and then compile the intermediate transformed code into executable code.

As part of compiling program source code 310 into transformed code 330, compiler 320 may perform desugaring, which may effectively modify error/exception propagation policy, as described herein.

As illustrated in FIG. 3, transformed code 330 may be passed to an execution environment, such as 340, which executes the code, thereby creating various output data and/or behavior 350 including a propagation policy that may permit suppressed exception support and allow for multiple exceptions without losing exception data. In various embodiments, execution environment 340 may include a physical computer system, a virtual machine (e.g., Java™ Virtual Machine), a software environment (e.g., container, web browser, etc.), support libraries, and/or various other components usable to execute transformed code 330, either directly or by interpretation.

In different circumstances, output/behavior 350 may include data stored in various levels of system memory (e.g., in-memory objects and/or data structures), on persistent storage (e.g., files on a file system), etc. Behavior 350 may also include various program functionalities, such as displaying output on a screen, sending messages over a network, and/or otherwise interacting with various users and/or components.

Figure 4:
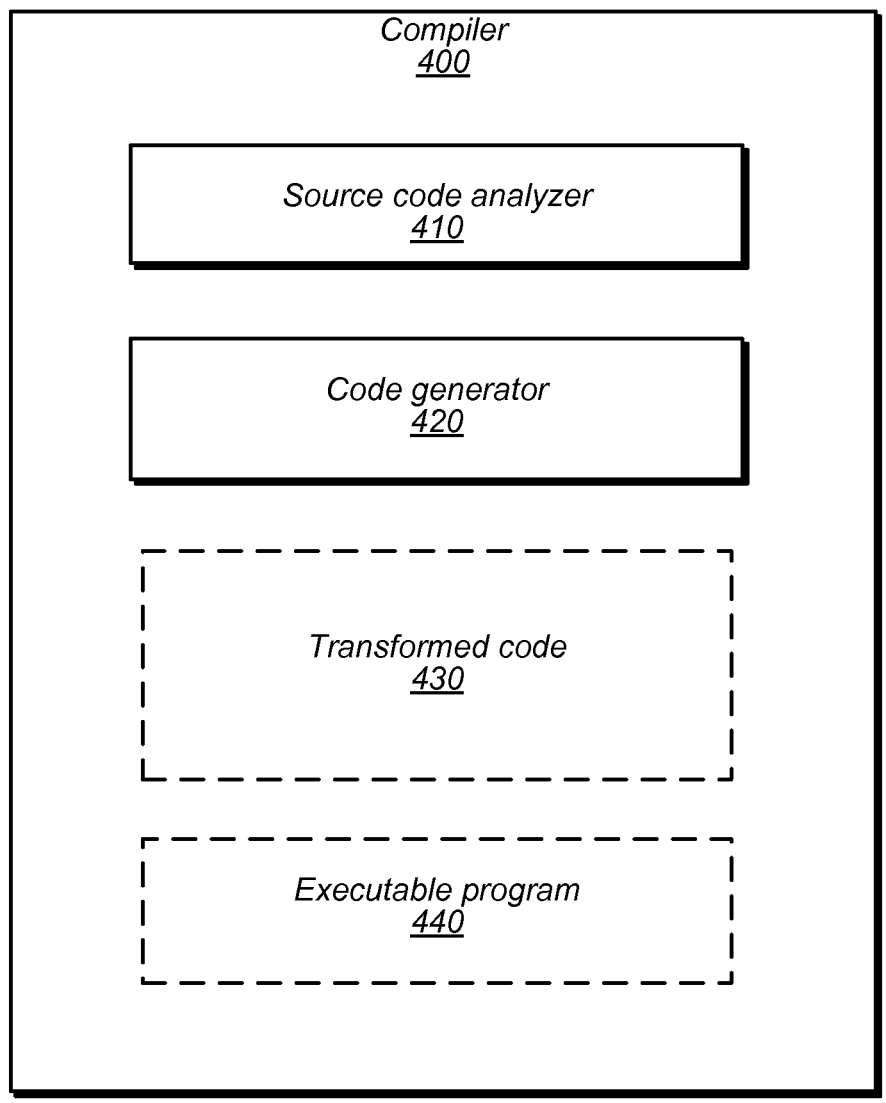
FIG. 4 is a block diagram illustrating example components of a compiler configured to perform transforming source code such that the transformed code supports multiple exceptions, according to various embodiments.

FIG. 4 is a block diagram illustrating the components of a compiler configured to perform transforming source code that allows an exception to be propagated and another exception to be stored, according to various embodiments. According to various embodiments, the compiler may be implemented in software and executed by a computer system on given source code, such as source code 410. As in FIG. 3, solid outlines in FIG. 4 indicate functional components while dashed lines indicate data structures passed among the functional components.

According to the illustrated embodiment, compiler 400 includes source code analyzer 410, code generator 420, transformed code 430, and executable program 440. Source code analyzer 410 may be configured to analyze the received source code and determine a desugaring technique based on the analysis. Code generator 420 may be configured to apply a desugaring or transformation technique resulting in desugared, transformed code 430. For example, one desugaring technique may result in the first transformed code example above where another desugaring technique may result in the one of the other examples above (or some other transformed code that supports the multiple exception propagation policy described herein). In some embodiments, transformed code 430 may be executable program 440 and may be executable, for example, in an execution environment (e.g., virtual machine). Thus, in some embodiments, either of transformed code 430 or executable program 440 may refer to transformed code 330 of FIG. 3. In other embodiments, code generator 420 may further process/compile transformed code into executable program 440.

In various embodiments, different components of compiler 400 may be combined or further deconstructed into multiple components. Various functionality may be performed by different components without limitation and the compiler may implement various additional compilation functionality, such as optimization, line reconstruction, and/or other functionality known in the art.

Figure 5:
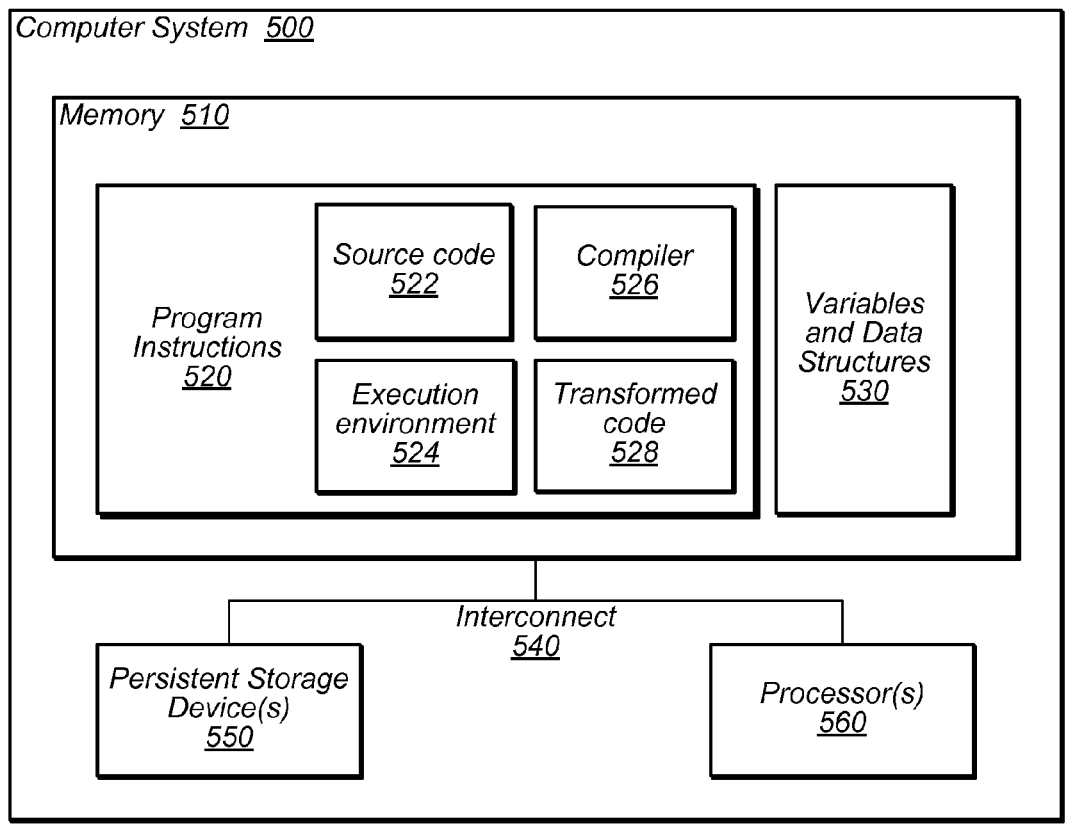
FIG. 5 is a block diagram illustrating a computer system configured to implement an error propagation mechanism that supports multiple exceptions as described herein, according to various embodiments.

FIG. 5 is a block diagram illustrating a computer system configured to implement error propagation techniques as described herein, according to various embodiments. The computer system 500 may correspond to any of various types of devices, including, but not limited to, a personal computer system, desktop computer, laptop or notebook computer, mainframe computer system, handheld computer, tablet device, workstation, network computer, a consumer device (e.g., mobile device such as a cellular/smart phone), application server, storage device, a peripheral device such as a switch, modem, router, etc, or in general any type of computing device.

The compiler components, source code, and/or code to execute various compilation methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 500 may include one or more processors 560, each of which may include multiple cores, any of which may be single or multi-threaded. The computer system 500 may also include one or more persistent storage devices 550 (e.g. optical storage, magnetic storage, hard drive, tape drive, solid state memory, etc), which may persistently store, for example, data such as program source code 310, transformed code 330, and/or various outputs 350 as shown in FIG. 3.

According to the illustrated embodiment, computer system 500 may include one or more memories 510 (e.g., one or more of cache, SRAM, DRAM, RDRAM, EDO RAM, DDR 10 RAM, SDRAM, Rambus RAM, EEPROM, etc.). The one or more processors 560, the storage device(s) 550, and the system memory 510 may be coupled to an interconnect 540. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, wireless or other network adaptor, monitors, keyboards, speakers, etc.).

One or more of the system memories 510 may contain program instructions 520. Program instructions 520 may be encoded in platform native binary, any interpreted language such as Java™ byte-code, or in any other language such as C/C++, Java™, etc or in any combination thereof. Program instructions 520 may include various source code 522, for one or more applications, which may be transformed into transformed code 528 by compiler 526. In various embodiments, source code 522 may include at least two blocks of user source code, as described herein.

In some embodiments, compiler 526 may correspond to compiler 400 of FIG. 4 and may be configured to transform received source code that may modify an error propagation policy to support multiple exceptions. In some embodiments, transformed code 528 may correspond to transformed code 330 of FIG. 3 and be encoded in an interpreted language, Java™ byte-code, a native binary language specific to computer system 500, and/or in various other executable language formats.

In some embodiments, program instructions 520 may further comprise one or more execution environments, such as execution environment 524, for executing transformed code 528 on computer system 500. Execution environment 524 may correspond to execution environment 340 of FIG. 3 and may comprise various virtual machines, software containers, software libraries, interpreters, and/or other software infrastructure necessary for executing executable code 528. For example, in some embodiments, execution environment 524 may comprise one or more Java™ Virtual Machines for executing Java™ byte-code of executable code 528.

In some embodiments, memory 510 may include any number of in-memory variables and data structures, such as 530. Variables and data structures may comprise compiler data structures. In some embodiments, variables and data structures 530 may include in-memory objects allocated by execution environment 524 in response to executing transformed code 528. Such in-memory objects may include variables and/or data structures of different types.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A non-transitory computer-readable storage medium storing program instructions executable by a computer to implement a compiler, wherein the compiler is configured to:
   receive source code that includes a first user source code block capable of throwing a first exception and a second user source code block capable of throwing a second exception, wherein the source code is associated with a policy that discards a pending exception when a subsequent exception occurs; and
   transform the source code, wherein the transformed source code, when executed, allows the first exception as the pending exception to be propagated and the second exception as the subsequent exception to be stored for later retrieval or handling.

2. The non-transitory computer-readable storage medium of claim 1, wherein the first exception occurs in time before the second exception.

3. The non-transitory computer-readable storage medium of claim 1, wherein the first user source code block is a try block or a catch block and the second user source code block is a finally block.

4. The non-transitory computer-readable storage medium of claim 1, wherein the received source code includes at least one checked exception.

5. The non-transitory computer-readable storage medium of claim 1, wherein said transforming includes compiling the source code directly into byte-code level constructs.

6. The non-transitory computer-readable storage medium of claim 1, wherein to perform said transforming, the compiler is configured to:
   receive a parameter; and
   transform the source code based on the parameter.

7. The non-transitory computer-readable storage medium of claim 1, wherein the program instructions are further executable to implement a runtime environment configured to:
   execute the transformed source code;
   throw the first exception;
   throw the second exception after the first exception is thrown and while the first exception is still pending; and
   propagate the first exception.

8. The non-transitory computer-readable storage medium of claim 1, wherein one or more properties of the transformed source code match semantics of the received source code.

9. The non-transitory computer-readable storage medium of claim 1, wherein to perform said transforming, the compiler is configured to:
   use a compiler internal exception type to force execution of a catch block.

10. The non-transitory computer-readable storage medium of claim 1, wherein to perform said transforming, the compiler is configured to:
    move the second user source code block into an anonymous inner class of a synthesized autocloseable type, wherein the second user code block is a finally block.

11. The non-transitory computer-readable storage medium of claim 1, wherein the transformed code includes an explicit declaration of a synthesized extended anonymous inner class.

12. A method, comprising:
    a compiler receiving source code that includes a first user source code block capable of throwing a first exception and a second user source code block capable of throwing a second exception, wherein the source code is associated with a policy that discards a pending exception when a subsequent exception is received; and
    the compiler transforming the source code, wherein the transformed source code is executable to propagate the first exception as the pending exception and store the second exception as the subsequent exception for later retrieval or handling.

13. The method of claim 12, wherein the first exception occurs earlier in time than the second exception.

14. The method of claim 12, wherein said transforming is based on a characteristic of the source code.

15. The method of claim 14, wherein a degree of preservation of various properties of the transformed source code to semantics of the received source code depends on said transforming.

16. The method of claim 12, wherein the second user source code block is a finally block.

17. A method, comprising:
    receiving transformed code, wherein the transformed code is a result of a transformation of source code that includes first and second user source code blocks each capable of throwing exceptions, wherein the source code is configured to apply a policy that discards a pending exception when a subsequent exception is thrown;

wherein the transformed code is configured to implement a different policy that propagates a first exception as the pending exception and stores a second exception as the subsequent exception for later retrieval or handling.

18. The method of claim 17, further comprising:

executing the transformed code, wherein said executing includes:
- generating a first exception;
- generating a second exception; and
- propagating the first exception and storing the second exception.

19. The method of claim 17, wherein the first exception occurs in time before the second exception.

20. The method of claim 17, wherein the transformed code includes byte-code level constructs.

\* \* \* \* \*